United States Patent [19]

Kishi et al.

[11] Patent Number: 4,754,269
[45] Date of Patent: Jun. 28, 1988

[54] GRAPHIC DISPLAY METHOD FOR DISPLAYING A PERSPECTIVE VIEW OF AN OBJECT ON A CRT

[75] Inventors: Hajimu Kishi; Kunio Tanaka, both of Tokyo, Japan

[73] Assignee: Fanuc Ltd, Minamitsuru, Japan

[21] Appl. No.: 800,619

[22] PCT Filed: Mar. 5, 1985

[86] PCT No.: PCT/JP85/00108

§ 371 Date: Oct. 31, 1985

§ 102(e) Date: Oct. 31, 1985

[87] PCT Pub. No.: WO85/04034

PCT Pub. Date: Sep. 12, 1985

[30] Foreign Application Priority Data

Mar. 5, 1984 [JP] Japan ................................. 59-041762

[51] Int. Cl.$^4$ ............................................. G09G 1/02
[52] U.S. Cl. ..................................... 340/729; 340/724; 340/727; 364/521; 364/522
[58] Field of Search ............... 340/729, 727, 724, 726, 340/709, 711, 365 R, 725; 364/521, 522

[56] References Cited

U.S. PATENT DOCUMENTS

| | | | |
|---|---|---|---|
| 3,621,214 | 11/1971 | Romney et al. | 364/522 |
| 3,731,299 | 5/1973 | Bouchard et al. | 340/711 |
| 4,127,849 | 11/1978 | Okor | 340/729 |
| 4,222,048 | 9/1980 | Johnson | 340/727 |
| 4,467,412 | 8/1984 | Hoff | 340/727 |
| 4,490,781 | 12/1984 | Kishi et al. | |
| 4,600,919 | 7/1986 | Stern | 340/725 |

*Primary Examiner*—Gerald L. Brigance
*Assistant Examiner*—Jeffery A. Brier
*Attorney, Agent, or Firm*—Staas & Halsey

[57] ABSTRACT

A graphic display method for transforming three-dimensional coordinate values (x, y, z) of an object to be displayed into coordinate values (X,Y) of a two-dimensional display coordinate system on a CRT display screen (DPS), and displaying a perspective view of the object on the CRT display screen (DPS) by using two-dimensional coordinate values obtained by the transformation. In the method, $\beta$ represents an angle between x and y axes among three-dimensional coordinate axes of the perspective view displayed on the CRT screen (where the counter-clockwise direction is taken as positive with the x axis serving as a reference), $\alpha$ represents the angle between the x axis and an X axis of a display coordinate system (where the counter-clockwise direction is taken as positive with the X axis serving as a reference), and ($X_o, Y_o$) represent coordinate values of a three-dimensional coordinate origin (DRP) of the perspective view in the display coordinate system. A keyboard is provided with keys for incrementing and decrementing the angle $\alpha$. The method has a step of increasing $\alpha$ by pressing the increment key or decreasing $\alpha$ by pressing the decrement key, and a step of transforming the three dimensional coordinate values into the display coordinate system (X-Y) by the formula $$\begin{pmatrix} X \\ Y \\ 1 \end{pmatrix} = \begin{pmatrix} \cos\alpha & \cos(\alpha + \beta) & 0 \\ \sin\alpha & \sin(\alpha + \beta) & 1 \\ 0 & 0 & 0 \end{pmatrix} \begin{pmatrix} x \\ y \\ z \end{pmatrix} + \begin{pmatrix} X_o \\ Y_o \\ 1 \end{pmatrix}$$

The perspective view of the three-dimensional object is displayed while it is rotated by using the coordinate values in the display coordinate system obtained by the transformation.

7 Claims, 3 Drawing Sheets

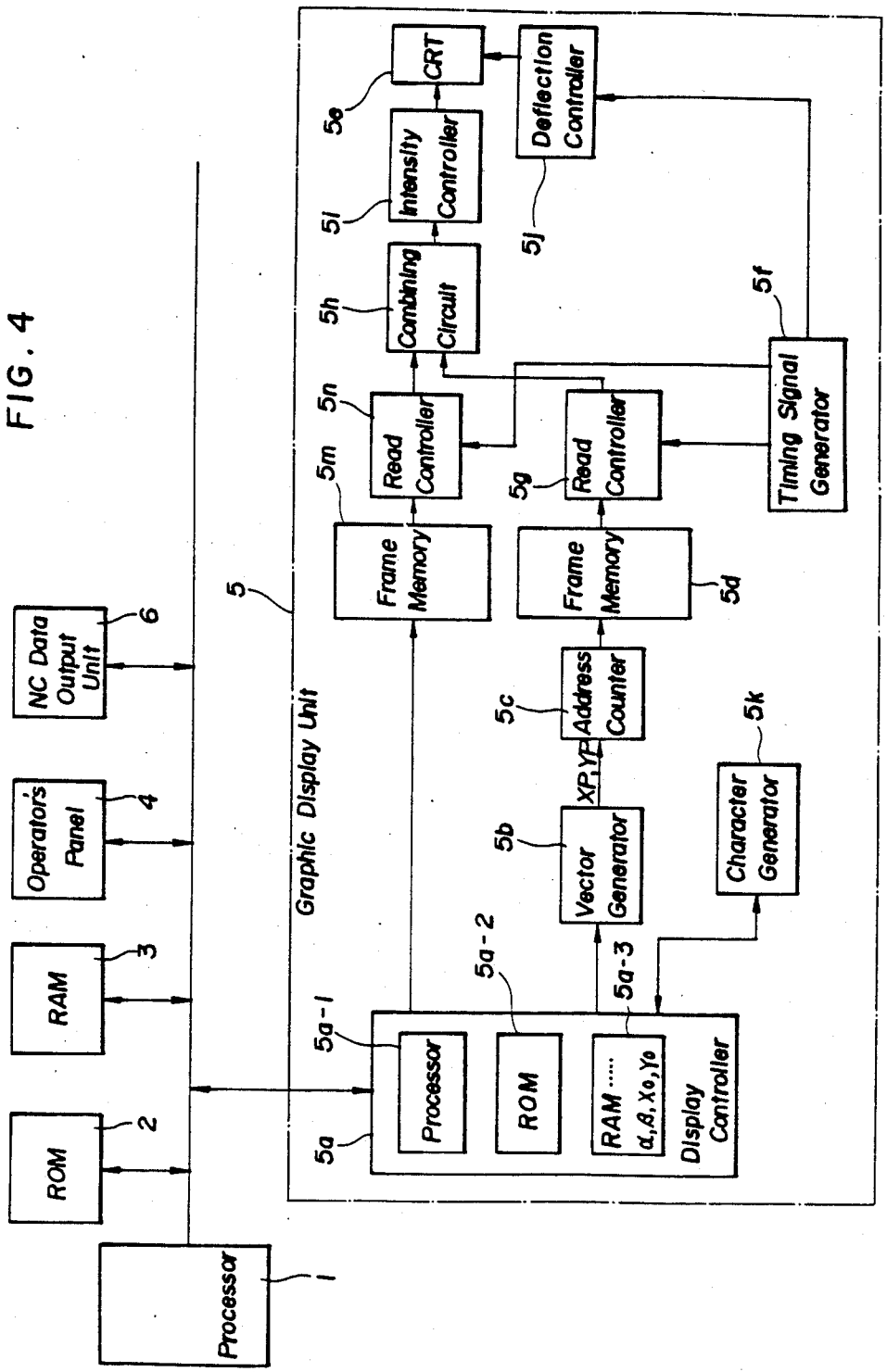

GRAPHIC DISPLAY METHOD FOR DISPLAYING A PERSPECTIVE VIEW OF AN OBJECT ON A CRT

BACKGROUND OF THE INVENTION

This invention relates to a graphic display method and, more particularly, to a graphic display method for transforming the three-dimensional coordinate values of an object to be displayed into the coordinate values of a two-dimensional display coordinate system, and displaying a perspective view of the object on a CRT display screen by using the two-dimensional coordinate values obtained by the transformation, wherein the position at which the perspective view is displayed can be shifted, and the perspective view rotated, in a simple manner.

Graphic display units are in use everywhere as means for implementing CAD/CAM (computer aided design and manufacturing). It is essential that these graphic display units be capable of displaying the perspective view of a three-dimensional object on a display screen (CRT screen). To this end, conventional graphic display units are adapted to display a perspective view of a three-dimensional object and are capable of enlarging and reducing the size of the displayed view.

There are situations where it is desired to shift the position at which the perspective view is displayed on the CRT screen or to display the perspective view on the CRT screen upon changing the position from which the three-dimensional object is observed. In other words, there are times when one wishes to display the perspective view on the CRT screen while the view is rotated. In such cases, the conventional practice is to enter the display position and the angle of rotation from a keyboard to change the position at which the perspective view is displayed or to display the perspective view upon rotation.

With the conventional practice however, operation is troublesome, the display position cannot be changed continuously, and the perspective view cannot be displayed while it is being continuously rotated.

In addition, specialized hardware such as a joystick is provided and the joystick is used to change the display position or the angle of rotation of the perspective view. Thus, extra hardware is required, which is undesirable in view of cost.

SUMMARY OF THE INVENTION

An object of the present invention is to provide a graphic display method whereby the position at which a perspective view is displayed can be changed, and the perspective view rotated, through simple operations.

Another object of the present invention is to provide a graphic display method whereby the position at which a perspective view is displayed on a CRT screen can be changed continuously and, moreover, whereby the perspective view can be displayed while being continuously rotated.

A further object of the present invention is to provide a graphic display method in which use is made of numeric keys provided on a keyboard, as well as the arrangement of the keys. The keys constituting the numeric keys are employed as display position change keys and rotation angle change keys, and the display position or the angle of rotation of a perspective view is changed by a predetermined amount whenever these keys are pressed.

The present invention provides a graphic display method for transforming three-dimensional coordinate values (x, y, z) of an object to be displayed into coordinate values (X, Y) of a two-dimensional display coordinate system on a CRT display screen, and displaying a perspective view of the object on the CRT display screen by using the two-dimensional coordinate values obtained by the transformation. Let $\beta$ represent an angle between x and y axes among the three-dimensional coordinate axes of the perspective view displayed on the CRT screen (where the counter-clockwise direction is taken as positive with the x axis serving as the reference), $\alpha$ the angle between the x axis and an X axis of a display coordinate system (where the counter-clockwise direction is taken as positive with the X axis serving as the reference), and $(X_o, Y_o)$ the coordinate values of the three-dimensional coordinate origin of the perspective view in the display coordinate system. The three-dimensional coordinates are transformed into the display coordinate system by the following formula:

$$\begin{pmatrix} X \\ Y \\ 1 \end{pmatrix} = \begin{pmatrix} \cos\alpha & \cos(\alpha + \beta) & 0 \\ \sin\alpha & \sin(\alpha + \beta) & 1 \\ 0 & 0 & 0 \end{pmatrix} \begin{pmatrix} x \\ y \\ z \end{pmatrix} + \begin{pmatrix} X_o \\ Y_o \\ 1 \end{pmatrix}$$

Keys for incrementing and decrementing the angle $\alpha$ are provided on a keyboard, and the perspective view of the object to be displayed is rotated, while being displayed, by increasing $\alpha$ when the increment key is pressed and decreasing $\alpha$ when the decrement key is pressed. The keyboard is provided with keys for shifting the three-dimensional coordinate origin of the perspective view in the X and Y directions. By pressing these keys, the coordinate values of the three-dimensional origin are changed to alter the position at which the perspective view of the object is displayed. Employed as the display position change keys and the $\alpha$ change keys are numeric keys (shape symbol keys) the keytops of which have arrow symbols indicating directions along the various axes. According to the present invention, the perspective view of the three-dimensional object can be displayed while rotated in a simple manner, and the perspective view can be displayed on the CRT screen while being continuously rotated. Moreover, the position at which the perspective view of the three-dimensional object is displayed can be moved, and the display position can be moved continuously. Furthermore, numeric keys can be used as the display position change keys and $\alpha$ change keys, and keys need not be separately provided for incrementing and decrementing. This is advantageous in terms of cost.

BRIEF DESCRIPTION OF THE DRAWINGS

FIG. 4 is a block diagram of a graphic display unit and is useful in describing the present invention.

DESCRIPTION OF THE PREFERRED EMBODIMENT

Figure 1:
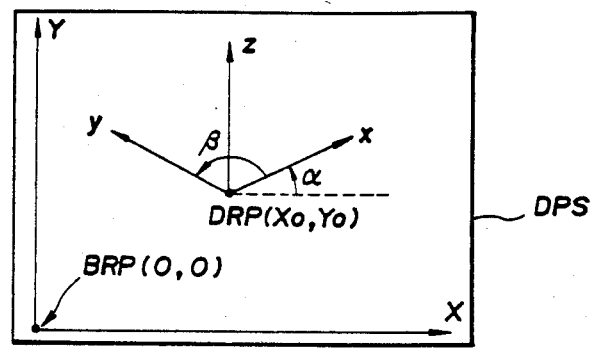
FIG. 1 is a schematic view of describing the present invention.

FIG. 1 is a schematic view for describing the present invention. DPS represents the display surface (referred to as a CRT surface) of a cathode-ray tube (CRT). BRP denotes the origin of a display coordinate system (X-Y coordinate system) on the CRT screen, the coordinate values of the origin being (0, 0). DRP designates the origin of three-dimensional axes (x-y-z) of a perspective view displayed on the CRT screen, the coordinate values of the origin being ($X_o$, $Y_o$). Further, $\alpha$ represents the angle between the x axis among the three-dimensional coordinate axes of the perspective view displaying on the CRT screen, and the X axis of the display coordinate system (where the counter-clockwise direction is taken as positive with the X axis serving as the reference), and $\beta$ denotes the angle between the x axis and y axis of the three-dimensional coordinate axes of the perspective view displayed on the CRT screen (where the counter-clockwise direction is taken as positive with the x axis serving as the reference).

The three-dimensional coordinate values (x, y, z) of a three-dimensional object expressed in a three-dimensional coordinate system are transformed into coordinate values (X, Y) in the display coordinate system by the formula $$\begin{pmatrix} X \\ Y \\ 1 \end{pmatrix} = \begin{pmatrix} \cos\alpha & \cos(\alpha + \beta) & 0 \\ \sin\alpha & \sin(\alpha + \beta) & 1 \\ 0 & 0 & 0 \end{pmatrix} \begin{pmatrix} x \\ y \\ z \end{pmatrix} + \begin{pmatrix} X_o \\ Y_o \\ 1 \end{pmatrix} \quad (1)$$

Accordingly, if the coordinate values of the three-dimensional object expressed in the three-dimensional coordinate system, the angles $\alpha$, $\beta$ and the coordinate values ($X_o$, $Y_o$) of the three-dimensional coordinate origin DRP in the display coordinate system are given, the display unit obtains the coordinate values in the display coordinate system by applying the transformation processing of Eq. (1) to each of the three-dimensional coordinate values, and displays a perspective view of the three-dimensional object on the CRT display screen DPS by using the coordinate values in the display coordinate system. If the angle $\alpha$ is changed, or in other words, if the direction from which the three-dimensional object is viewed is changed, the display unit displays on its CRT screen a perspective view which results from a predetermined amount of rotation about the z axis. If the position of the three-dimensional coordinate origin DRP is changed, then the position of the perspective view will be shifted as the view is displayed.

As keys for changing the angle $\alpha$ as well as the position of the three-dimensional coordinate origin, the present invention uses various shape symbol keys, which double as numeric keys, provided on a keyboard of an automatic programming system for creating NC programs automatically. The angle $\alpha$ or the position ($X_o$, $Y_o$) of the three-dimensional coordinate origin is changed by predetermined amounts whenever these keys are pressed, so that the perspective view is rotated and displayed continuously and, moreover, so that the position at which the perspective view is displayed is changed continuously.

Figure 2:
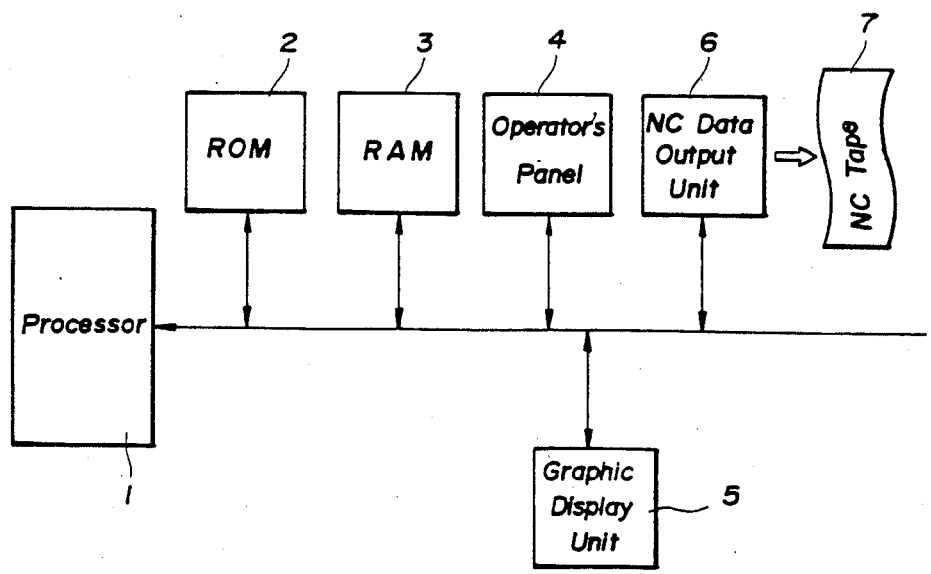
FIG. 2 is a block diagram of an automatic programming system to which the present invention can be applied.

FIG. 2 is a block diagram of an automatic programming system to which the present invention can be applied. Numeral 1 denotes a processor, 2 a ROM for storing a control program, 3 a RAM for storing various data, 4 an operator's panel having various keys, 5 a graphic display unit, 6 an NC data output unit, and 7 an NC tape.

Figures 3, 5A, 5B, 5C:
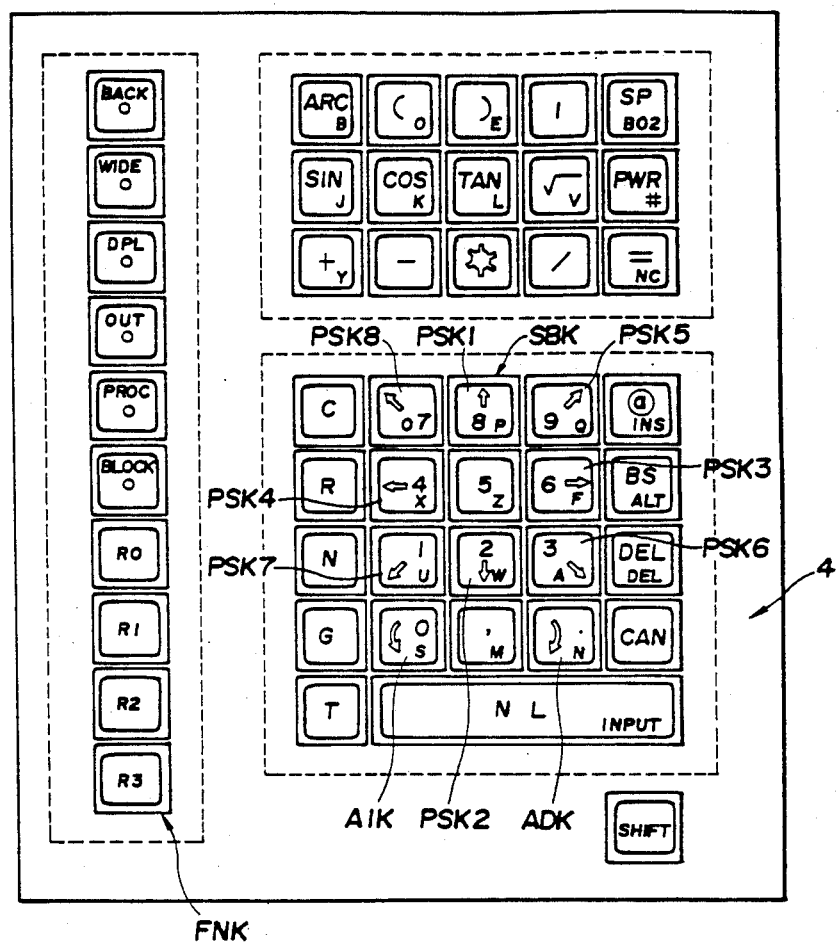
FIG. 3 is a view for describing an operator's panel.
FIGS. 5(A), 5(B) and 5(C) is a for explaining how a perspective view is displayed while being rotated.

With such an automatic programming system, data can be entered from the operator's panel in a conversational format using a graphic display screen and an NC tape can be created through a simple operation by using a design drawing. Specifically, in accordance with a part profile drawn out on a design drawing, a part profile can be entered merely by pressing corresponding shape symbol keys, which serve also as numeric keys and which will be described later, provided on the operator's panel 4. As this is done, reference information is graphically displayed on the graphic display screen, and prompts appear in ordinary language. Accordingly, dimensions and various data can be entered from the operator's panel in response to the prompts. When all data necessary for NC tape creation have been entered, the finished profile quickly appears on the CRT screen of the graphic display unit 5, automatic computations for the NC tape start, and the NC tape is created as a tool path is displayed on the CRT screen. Entry of a part profile in such automatic programming takes place through a procedure which will now be described. Predetermined ones of function keys FNK shown in FIG. 3 are pressed to cause prompts for part profile entry to be displayed on the CRT screen. Next, while viewing a design drawing, one responds to the prompts by entering the part profile, which is accomplished by operating shape symbol keys SBK (keys having keytops bearing the arrow marks ↑, →, ←, ↓, ╱, ╲, ╲, ╱, and ╰ along with numerical values and the decimal point symbol), which double as numeric keys, a C key indicative of chamfering, and an R key indicative of rounding. These keys are provided on the operator's panel 4 and are operated in accordance with the part profile. Each time one element of a part profile is entered by pressing a numeric/shape symbol key SBK, the C key or the R key, a prompt calling for the dimensions of the element is displayed on the CRT screen. Accordingly, if one responds to these prompts by using the numeric/shape symbol keys SBK to enter dimensions taken from the design drawing, the operation for specifying the part profile can be completed.

Though the numeric/shape symbol keys SBK function automatically as profile input keys, numerical value input keys or displayed graphic rotate/move keys depending upon the processing step, an arrangement can be adopted in which a special key is provided and the above keys are made to function as rotate/move keys only when the special key is pressed. Reference should be had to the specification of Japanese Patent Application Laid-Open No. 57-19809 with regard to the foregoing automatic programming operation.

Among the shape symbol keys, the present invention uses a ╲ key (0 key) AIK as a key for incrementing the angle $\alpha$ (FIG. 1), a ╱ key (decimal point key) ADK as a key for decrementing the angle $\alpha$, a ↑ key (8 key) PSK1 as a key for incrementing the Y-axis coordinate value $Y_o$ of the three-dimensional coordinate origin, a ↓ key (2 key) PSK2 as a key for decrementing $Y_o$, a → key (6 key) PSK3 as a key for incrementing the X-axis coordinate value $X_o$ of the three-dimensional coordinate origin, a ← key (4 key) PSK4 as a key for decrementing $X_o$, a key ╱ (9 key) PSK5 as a key for simultaneously incrementing $X_o$, $Y_o$, a key ╲ (3 key) PSK6 as a key for incrementing $X_o$ and decrementing $Y_o$, a key ╲ (1 key)

PSK7 as a key for simultaneously decrementing $X_o$, $Y_o$, and a key \ (7 key) PSK8 as a key for decrementing $X_o$ and incrementing $Y_o$.

FIG. 4 is a block diagram of a display unit 5 for practicing the graphic display method of the present invention, with portions identical with those shown in FIG. 2 being designated by like reference numerals. A display controller 5a is constituted by a computer and has a processor 5a-1, a ROM 5a-2 and a RAM 5a-3. Stored previously in the RAM 5a-3 is three-dimensional graphic information indicative of an object to be displayed, as well as the angles $\alpha$, $\beta$ and the coordinate values ($X_o$, $Y_o$) of the three-dimensional coordinate origin DRP (FIG. 1) in the display coordinate system. The processor 5a-1 reads three-dimensional picture information (x, y, z) out of the RAM 5a-3 in succession, executes the coordinate transformation processing of Eq. (1) to obtain the coordinate values (X, Y) in the display coordinate system by using $\alpha$, $\beta$, $X_o$, $Y_o$, and applies the coordinate values to a vector generator 5b. The vector generator 5b uses the input coordinate values to perform an ordinary linear or circular interpolation calculation, thus to generate interpolated pulses XP, YP along the respective axes, which pulses are applied to an address counter 5c. The address counter 5c includes two address counters (not shown), one for the X and the other for the Y axis. These count the interpolated pulses along the respective axes and write a "1" into a storage location of a frame memory 5d designated by the X- and Y-axis address counters each time. The frame memory 5d is of matrix construction and has one-bit storage locations corresponding to the pixel positions of the CRT display screen. Each time an interpolation pulse is generated, a "1" is written into a storage location at a matrix cross point designated by the X- and Y-axis address counters. When a perspective view has been stored in the frame memory 5d by the foregoing processing, the stored information is subsequently read out of the frame memory 5d in synchronism with the deflection of the CRT beam, and intensity modulation is performed using the stored information to display the perspective view on a CRT 5e. It should be noted that a timing signal generator 5f produces a timing signal for reading the stored information out of the frame memory 5d, and a timing signal for deflecting the beam. A read controller 5g reads the stored information out of the frame memory 5d on the basis of the timing signal and applies the stored information to an intensity controller 5i via a combining circuit 5h. The intensity controller 5i performs intensity modulation based on the stored information. A deflection controller 5j deflects the beam horizontally and vertically in synchronism with the timing signal.

If the information read out of the RAM 5a-3 is a character code, the processor 5a-1 reads the character pattern indicated by the character code out of a character generator 5k and stores the pattern in a frame memory 5m for character pattern storage. Thereafter, a read controller 5n sequentially reads the stored information out of the frame memory 5m in synchronism with a timing signal produced by the timing signal generator 5f. The combining circuit 5h combines this information with the signal read out of the frame memory 5d and applies the result to the intensity controller 5i to undergo intensity modulation.

When the \ key (0 key) AIK among the shape symbol keys on operator's panel 4, is pressed with the perspective view of the three-dimensional object being displayed on the CRT screen as a result of the foregoing processing, the processor 1 increments the angle of rotation $\alpha$, which is stored in the RAM 3, each time this key is pressed by performing the operation $$\alpha + \Delta\alpha \rightarrow \alpha \qquad (2)$$

The processor 1 decrements the angle of rotation $\alpha$ by the operation $$\alpha - \Delta\alpha \rightarrow \alpha \qquad (3)$$

each time the ⟩ key (decimal point key) ADK among the shape symbol keys is pressed. Further, the processor 1 increments the Y-axis coordinate value $Y_o$ of the three-dimensional coordinate origin by the operation $$Y_o + \Delta Y \rightarrow Y_o \qquad (4)$$

each time the ↑ key (8 key) PSK1 among the shape symbol keys is pressed, decrements the Y-axis coordinate value $Y_o$ of the three-dimensional coordinate origin by the operation $$Y_o - \Delta Y \rightarrow Y_o \qquad (5)$$

each time the ↓ key (2 key) PSK2 is pressed, increments the X-axis coordinate value $X_o$ of the three-dimensional coordinate origin by the operation $$X_o + \Delta X \rightarrow X_o \qquad (6)$$

each time the → key (6 key) PSK3 is pressed, decrements $X_o$ by the operation $$X_o - \Delta X \rightarrow X_o \qquad (7)$$

each time the ← key (4 key) PSK4 is pressed, increments $X_o$, $Y_o$ simultaneously by Eqs. (4), (6) each time the ⁄ key (9 key) PSK5 is pressed, increments $X_o$ by Eq. (6) and decrements $Y_o$ by Eq. (5) each time the key (3 key) PSK6 is pressed, decrements $X_o$, $Y_o$ simultaneously by Eqs. (5), (7) each time the ⁄ key (1 key)⁄ PSK7 is pressed, and decrements $X_o$ by Eq. (7) and increments $Y_o$ by Eq. (4) each time the \ key (7 key) PSK8 is pressed.

When the processor 1 has updated the angle of rotation $\alpha$, $X_o$ or $Y_o$ by Eqs. (4)–(7) due to operation of prescribed numeric/shape symbol keys, they are applied to the graphic display unit 5. After storing the updated values in the RAM 5a-3, the processor 5a-1 of the graphic display unit 5 sequentially reads three-dimensional coordinate information out of the RAM 5a-3, executes the transformation processing of Eq. (1) using these new values of $\alpha$, $X_o$, $Y_o$ and $\beta$ to obtain two-dimensional coordinate values of the display coordinate system, and applies these to the vector generator 5b to display the perspective view of the three-dimensional object, which has been rotated by a predetermined amount just as described above, or to shift the position of the perspective view by a predetermined amount in a predetermined direction while the view is displayed.

FIG. 5 is a conceptual view for a case where a perspective view is displayed while being rotated by using the \ key (0 key) AIK and ⟩ key (decimal point key) ADK. When the ⟩ key (0 key) AIK is pressed to increment $\alpha$, the three-dimensional coordinate axes on the CRT screen shown in FIG. 5(A) are rotated counterclockwise about the z axis to the attitude shown in FIG.

5(B). When the ⌐ key (decimal point key) ADK is pressed to decrement α, the three-dimensional coordinate axes on the CRT screen likewise assumes the attitude shown in FIG. 5(C). The perspective view of the three-dimensional object is displayed on the CRT screen based on the newly set three-dimensional coordinate axes.

In the case described above, the angle of rotation α and the the coordinate values $X_o$, $Y_o$ of the three-dimensional coordinate origin DRP are updated by Δα and ΔX, ΔY whenever the prescribed numeric/shape symbol keys SBK are pressed. However, it can be arranged so that the processor 1 updates α, $X_o$, $Y_o$ by performing the calculations of Eqs. (4)–(7) for predetermined periods of time in a case where a numeric/shape symbol key is held depressed continuously.

Further, in the case described above, the rotational display of the perspective view and the change in the display position of the perspective view are performed by using the numeric/shape symbol keys. According to the present invention, however, it is not always necessary to use numeric/shape symbol keys. Instead, suitable keys for rotation or display position alteration may be provided and these keys may be used to perform the operations for changing the angle of rotation and the display position. For example, a key for entering the alphabetic character L may be used as the α incrementing key, and a key for entering the alphabetic character R may be used as the α decrementing key.

In addition, the numeric/shape symbol keys SBK provided on the keyboard of an automatic programming system are used in the case described above. However, if the present invention is applied to a system other than such an automatic programming system, then the invention can be applied in the same manner by providing the keytops of the ordinarily furnished numeric keys with the arrow symbols ( ↑ , ╱ , → ,╲ , ↓ , ╱ , ← ,╲ , ⌐ and ⌐ ) .

According to the present invention as described above, keys for incrementing and decrementing α in Eq. (1) are provided, and the arrangement is such that α is incremented or decremented by a predetermined amount each time these keys are pressed, or for a predetermined period of time in a case where the keys are pressed continuously. This makes it possible to rotate and display the perspective view of a three-dimensional body in a simple manner and to continuously display the perspective view on a CRT screen while the view is rotated.

Further, keys for incrementing and decrementing the coordinate values $X_o$, $Y_o$ of the three-dimensional coordinate origin DRP are provided, and the arrangement is such that $X_o$, $Y_o$ are incremented or decremented by predetermined amounts each time these keys are pressed, or for a predetermined period of time in a case where the keys are pressed continuously. This makes it possible to shift the display position of the perspective view of the three-dimensional object in a simple manner and to shift the display position continuously.

In addition, the numeric/shape symbol keys provided in an automatic programming system can be used as the keys for incrementing and decrementing α, $X_o$ and $Y_o$, so that incrementing and decrementing keys need not be separately provided. This is advantageous in terms of cost. Moreover, since the keytops of the numeric/shape symbol keys are equipped with arrow symbols indicative of direction, which key should be pressed can be easily identified when incrementing and decrementing the angle of rotation α and when incrementing and decrementing $X_o$, $Y_o$. This makes possible a marked improvement in operability.

What is claimed is:

1. A graphic display method for transforming three-dimensional coordinate values (x, y, z) of an object to be displayed into coordinate values (X, Y) of a two-dimensional display coordinate system on a CRT display screen, and displaying and rotating a perspective view of the object on the CRT display screen by using two-dimensional coordinate values obtained by the transformation, where β represents an angle between x and y axes among three-dimensional coordinate axes of the perspective view displayed on the CRT screen with the x axis serving as a reference and the counter-clockwise direction defined to be positive, where α represents the angle between the x axis and an X axis of a display coordinate system with the X axis serving as a reference and the counter-clockwise direction defined to be positive, and where ($X_o$, $Y_o$) represent coordinate values of a three-dimensional coordinate origin of the perspective view in the display coordinate system, and a keyboard is provided with keys for incrementing and decrementing the angle α, said method comprising the steps of:
   (a) increasing α by pressing the increment key or decreasing α by pressing the decrement key;
   (b) transforming the three-dimensional coordinate values into the display coordinate system based on the formula $$\begin{pmatrix} X \\ Y \\ 1 \end{pmatrix} = \begin{pmatrix} \cos\alpha & \cos(\alpha + \beta) & 0 \\ \sin\alpha & \sin(\alpha + \beta) & 1 \\ 0 & 0 & 0 \end{pmatrix} \begin{pmatrix} x \\ y \\ z \end{pmatrix} + \begin{pmatrix} X_o \\ Y_o \\ 1 \end{pmatrix};$$

and
   (c) displaying the perspective view of the three-dimensional object while rotating the perspective view in accordance with the coordinate values in the display coordinate system obtained by said transforming step (b).

2. A graphic display method according to claim 1, wherein the keyboard is provided with shift keys for shifting a three-dimensional origin of the perspective view in X and Y directions, further comprising the steps of:
   changing coordinate values of the three-dimensional origin by pressing the shift keys; and
   changing the position at which the perspective view of the object is displayed in said step (c).

3. A graphic display method according to claim 1, wherein a plurality of shape symbol keys for graphic input are provided on the keyboard, and wherein said step (a) comprises actuating a first shape symbol key for incrementing α and actuating a second shape symbol key for decrementing α.

4. A graphic display method according to claim 2, wherein a plurality of shape symbol keys for graphic input are provided on the keyboard, wherein a first shape symbol key is used for incrementing $Y_o$, a second shape symbol key is used for decrementing $Y_o$, a third shape symbol key is used for incrementing $X_o$, a fourth shape symbol key is used for decrementing $X_o$, a fifth shape symbol key is used for simultaneously incrementing $X_o$, $Y_o$, a sixth shape symbol key is used for incrementing $X_o$ and decrementing $Y_o$, a seventh shape symbol key is used for simultaneously decrementing $X_o$, $Y_o$, and an eighth shape symbol key for decrementing $X_o$ and incrementing $Y_o$ in said coordinate value changing step.

5. A graphic display method according to claim 2, wherein keytops of numeric keys provided on the keyboard are equipped with symbols indicative of direction, and wherein the direction keys of the numeric keys are used for incrementing $\alpha$ and decrementing $\alpha$ in said step (a), and for incrementing $X_o$, decrementing $X_o$, incrementing $Y_o$ and decrementing $Y_o$ in said coordinate value changing step.

6. A graphic display method for displaying and rotating a perspective view of an object on a CRT display screen having a display coordinate system with an X axis and a Y axis, comprising the steps of:
   (a) providing three-dimensional coordinate values (x, y, z) for an object to be displayed;
   (b) providing angle data representing a first angle which is between the x and y axes;
   (c) providing angle data representing a second angle which is between the x axis and the X axis;
   (d) providing a coordinate origin ($X_o$, $Y_o$) representing coordinate values of a three-dimensional coordinate origin in the display coordinate system;
   (e) increasing the second angle by actuating an increment key or decreasing the second angle by actuating a decrement key;
   (f) transforming the three-dimensional coordinate values representing the object to be displayed into the display coordinate system of the CRT display; and
   (g) displaying the perspective view of the three-dimensional object while rotating the perspective view in accordance with the coordinate values in the display coordinate system obtained by said step (f).

7. A graphic display method according to claim 6, wherein said step (f) comprises transforming the three-dimensional coordinate value into the display coordinate system based on the formula $$\begin{pmatrix} X \\ Y \\ 1 \end{pmatrix} = \begin{pmatrix} \cos\alpha & \cos(\alpha + \beta) & 0 \\ \sin\alpha & \sin(\alpha + \beta) & 1 \\ 0 & 0 & 0 \end{pmatrix} \begin{pmatrix} x \\ y \\ z \end{pmatrix} + \begin{pmatrix} X_o \\ Y_o \\ 1 \end{pmatrix}$$

where $\alpha$ corresponds to the second angle and $\beta$ corresponds to the first angle.

* * * * *

UNITED STATES PATENT AND TRADEMARK OFFICE
CERTIFICATE OF CORRECTION

PATENT NO. : 4,754,269
DATED : JUNE 28, 1988
INVENTOR(S) : HAJIMU KISHI ET AL.

It is certified that error appears in the above-identified patent and that said Letters Patent is hereby corrected as shown below:

Col. 2, line 67, "is a" should be --are graphs--.

Col. 6, line 47, "(7)" should be --(7),--.

Signed and Sealed this

Twenty-ninth Day of November, 1988

Attest:

DONALD J. QUIGG

Attesting Officer

Commissioner of Patents and Trademarks